United States Patent

[11] 3,575,081

[72] Inventor Hubert Nerwin
 Rochester, N.Y.
[21] Appl. No. 700,057
[22] Filed Jan. 24, 1968
[45] Patented Apr. 13, 1971
[73] Assignee Eastman Kodak Company
 Rochester, N.Y.

[54] CAMERA HAVING A COMBINED VIEWFINDER AND SLIDE VIEWER
 8 Claims, 2 Drawing Figs.
[52] U.S. Cl. .................................................... 88/1.5, 95/12
[51] Int. Cl. .................................................... G03b 13/02
[50] Field of Search ........................................... 88/1.5; 95/12, 13 (Cursory)

[56] References Cited
UNITED STATES PATENTS
1,140,108 5/1915 Brown .......................... 88/1.5
3,446,131 5/1969 Cook et al. .................. 95/13

Primary Examiner—Ronald L. Wibert
Assistant Examiner—Orville B. Chew, II
Attorneys—Robert W. Hampton and Gary D. Fields ABSTRACT: A device is provided in a camera wherein the eyepiece of the viewfinder can be utilized in a slide viewer for viewing slide transparency units when inserted in the camera. The transparency is positioned off the axis of the viewfinder and a mirror is moved into the field of the eyepiece in response to insertion of a slide to change the device from a viewfinder to a slide viewer. Because it may be convenient to locate the transparency too close to the eyepiece for normal power of a viewfinder eyepiece, an auxiliary lens is moved into the system with movement of the mirror.

Patented April 13, 1971

3,575,081

HUBERT NERWIN
*INVENTOR.*

BY *Gary D. Fields*

*Robert W. Hampton*
ATTORNEYS

CAMERA HAVING A COMBINED VIEWFINDER AND SLIDE VIEWER

BACKGROUND OF THE INVENTION

1. Field of the Invention

This invention relates to a combined viewfinder and slide viewer for use in a camera. More particularly, the invention may be utilized in a camera wherein slide transparency units are processed within the camera and then viewed immediately following the processing.

2. Description of the Prior Art

Various types of viewfinders have been developed for use on cameras. In addition, there are many slide viewers available for viewing slide transparencies which are illuminated by either ambient light or by an artificial light source provided within the slide viewer. Such slide viewers have been provided on cameras in which the transparencies are both exposed and developed, such as in U.S. Pat. No. 3,225,670, which issued on Dec. 28, 1965 to Friedman et al.

SUMMARY OF THE INVENTION

In the present invention, a combined viewfinder and slide viewer is provided within a camera. The viewfinder is used in the conventional manner. When it is desired to use the device as a slide viewer, a slide transparency unit is inserted into a suitable slot provided for this purpose. Insertion of the slide causes a movable mirror mount to be moved so that a mirror will be brought into optical alignment with the viewfinder so that the transparency unit may be observed. Upon removal of the transparency unit, the mirror mount will return to its initial position so the viewfinder may be utilized for taking another picture. The mirror mount may also carry a lens which may be positioned during viewing of a transparency to increase the power of the eyepiece. This device has particular utility in a camera in which slide transparency units may be both exposed and developed. Thus, a means is provided for viewing developed slide transparency units immediately after removing it from the camera.

Additional novel features of this invention will become apparent from the following description, taken in conjunction with the accompanying drawings.

DESCRIPTION OF THE PREFERRED EMBODIMENT

Figure 1:
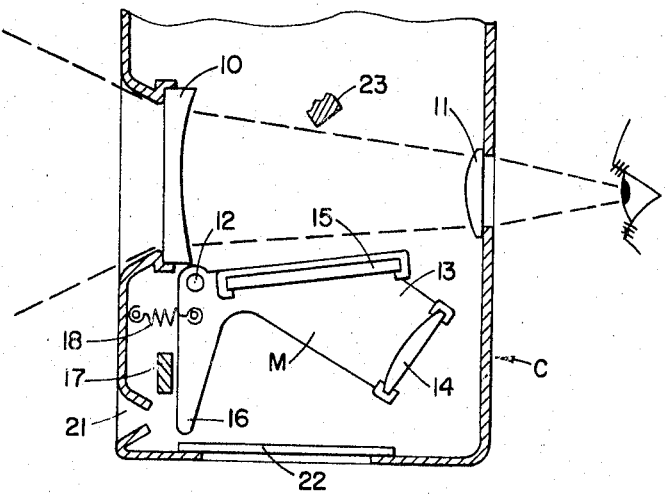
FIG. 1 is a fragmentary section through a portion of a camera showing the combined viewfinder and slide viewer of this invention showing the position of the mirror mount when used as a viewfinder.
Figure 2:
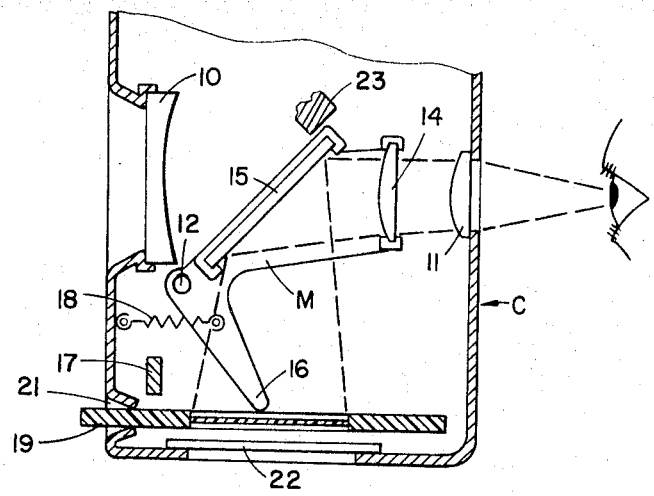
FIG. 2 is a fragmentary section, similar to FIG. 1, but showing the position of the mirror mount when the device is used as a slide viewer.

In accordance with this invention, a camera housing C may be provided with a conventional reverse Galilean viewfinder comprising a negative component or lens 10 and an eyepiece or positive lens 11 for viewing the scene to be photographed. In addition, the camera is provided with a pivotal mirror mount M mounted on a pivot pin 12 for movement from the position shown in FIG. 1 to the position shown in FIG. 2 and back again. Mirror mount M is generally L-shaped and includes a leg 13 having a positive lens 14 mounted at the end thereof and a mirror 15 extending obliquely from adjacent pivot pin 12 toward one side of lens 14. The other leg 16 of mirror mount M is normally held against stop 17 by a spring 18. When it is desired to view a slide, the transparency unit 19 may be inserted through a slot 21 into position over an illuminating window 22, which conveniently may be made of a translucent material. Upon insertion of the transparency unit 19 into the camera, the mount will engage leg 16 of mirror mount M causing it to be rotated about pivot pin 12 to the position shown in FIG. 2, so that mirror 15 and lens 14 are brought into the optical path between lens 10 and eyepiece 11 so that the image of the transparency unit is formed by light entering window 22 and is viewed with mirror 15 through lenses 14 and 11 by the eye of the viewer. Advantageously, a stop 23 may be provided to assure that mirror mount M does not pivot too far and is held in the proper position for viewing the transparency units. After viewing, the transparency unit may be removed from the camera and spring 18 will cause mirror mount M to return to the initial position shown in FIG. 1 so that the viewfinder may be used to view the next subject to be photographed.

For some applications, it might be desirable to make mirror 15 of a semireflective material so that a transparency unit and a scene to be photographed may be viewed at the same time in superimposed relationship. This would be helpful in situations where one wants to photograph sequential scenes in which the background remains essentially the same but the foreground changes. Thus, by superimposing the image on the slide with the scene to be photographed, this could be accomplished. When only the slide viewer is to be used, the operator could place his hand over lens 10 to block unwanted light or a separate means could be provided within the camera to accomplish this.

From the foregoing, it can be seen that the novel features of this invention have been fulfilled to a marked degree. A combined viewfinder and slide viewer is provided wherein a movable mirror mount is provided within a camera which is pivotal upon insertion of a slide transparency unit into the camera for viewing so that the image of the transparency unit is reflected from a mirror on the mirror mount and projected to the eye of the viewer.

The invention has been described in detail with particular reference to a preferred embodiment thereof, but it will be understood that variations and modifications can be effected within the spirit and scope of the invention as described hereinabove and as defined in the appended claims.

I claim:

1. In a combined viewfinder and slide viewer for a camera having a housing, the combination comprising:
   a first lens supported by said housing;
   a second lens supported by said housing spaced from said first lens, said first and second lenses forming a viewfinder having an optical path;
   a slide transparency illuminating means supported by said housing and spaced from said optical path;
   means attached to said housing for supporting a slide transparency unit for illumination by said illuminating means;
   an angularly shaped mirror mount having a pivot point and two legs extending outwardly therefrom;
   a mirror mounted on said mirror mount for movement from a first position out of said optical path to a second position in said optical path so that light projected by said illuminating means is reflected by said mirror through said first lens for viewing said slide transparency units;
   a third lens mounted at an end of one leg of said mirror mount, said mirror being supported by said mount and extending obliquely from adjacent said pivot point toward said third lens so that light reflected by said mirror, when said mirror is in said second position, passes through said third and first lenses, the other of said two legs being adapted to be engaged by a transparency unit upon insertion thereof in said support means to move said mount from said first position to said second position; and
   a spring having one end connected to said housing and having another end connected to said mirror mount, biasing said mirror mount toward said first position so that upon removal of said transparency unit from said supporting means said mirror mount returns to said first position.

2. In a combined viewfinder and slide viewer, provided in a camera having a housing which includes a first and second spaced sides interconnected by a third side, the combination comprising:
   a first lens supported by said first sidewall;

a second lens supported by said second sidewall, said first and second lenses forming a viewfinder having an optical path;

an illuminating window in said third wall through which ambient light can be projected through a transparency unit;

means defining a slot in said housing through which a transparency unit can be inserted into said housing in alignment with said illuminating window;

a pivot pin attached to said housing;

an angular mirror mount pivotally mounted within said housing about said pivot pin for movement between a first position and a second position and having two legs extending from said pivot pin;

a mirror mounted on said mirror mount extending from adjacent said pivot pin toward an end of one leg of said mirror mount;

a third lens mounted at said end of said one leg the other leg of said mirror mount being adapted to be engaged by a slide transparency upon insertion thereof through said slot defining means to pivot said mirror mount from said first position to said second position wherein said mirror and said third lens are positioned in said optical path to direct light projected through said illuminating window through said third lens and said first lens so that a slide transparency unit in said housing is viewable; and resilient means interconnecting said housing and said mirror mount biasing said mirror mount toward said first position so that upon removal of said transparency unit from said housing said mirror mount returns to said first position.

3. In a camera, a viewfinder comprising:

an eyepiece;

means for forming an image of an infinite scene at a first position, which first position is a first optical distance from said eyepiece and said image is a first object selectively viewable through said eyepiece;

means for receiving a slide transparency at a second position, a second optical distance from said eyepiece, which transparency is a second object selectively viewable through said eyepiece, wherein said first and second distances are such that one of said objects would be in focus if viewed through said eyepiece alone and the other of said objects would be out of focus if viewed through said eyepiece alone;

means for selecting between viewing said first object and viewing said second object; and means responsive to selecting said out of focus object for viewing for bringing said object into focus.

4. The viewfinder according to claim 3 wherein said focusing means is an auxiliary lens positionable between said eyepiece and said second position in response to insertion of a slide transparency in said second position.

5. The viewfinder according to claim 3 wherein said image forming means and said eyepiece have an optical axis, said second position is spaced from said optical axis and said selecting means includes reflecting means positionable on said optical axis in response to insertion of a slide transparency at said second position to render said slide transparency viewable through said eyepiece.

6. In a camera a viewfinder comprising:

an eyepiece;

means for forming an image of an infinite scene at a first position in the field of view of said eyepiece;

means for receiving a slide transparency at a position normally out of the field of view of said eyepiece;

reflecting means positionable in the field of view of said eyepiece to render said slide transparency viewable through said eyepiece at a position at which said transparency would be normally out of focus when viewed through said eyepiece;

a movable mounted auxiliary lens; and means responsive to insertion of a slide transparency in said receiving means for positioning said auxiliary lens between said eyepiece and said second position to render said transparency in focus when viewed through said eyepiece.

7. In a camera a viewfinder comprising:

an eyepiece;

means for forming an image of an infinite scene at a first position in the field of view of said eyepiece;

means for receiving a slide transparency at a position normally out of the field of view of said eyepiece;

reflecting means positionable in the field of view of said eyepiece to render said slide transparency viewable through said eyepiece at a position at which said transparency would be normally out of focus when viewed through said eyepiece;

a movable mounted auxiliary lens; and means for positioning said auxiliary lens between said eyepiece and said second position to render said transparency in focus when viewed through said eyepiece.

8. In a camera a viewfinder comprising:

an eyepiece;

means for forming an image of an infinite scene at a first position in the field of view of said eyepiece;

means for receiving a slide transparency at a position normally out of the field of view of said eyepiece;

reflecting means movable to a position in the field of view of said eyepiece such that it directs light from said transparency into said eyepiece to render said slide transparency viewable through said eyepiece; and means for moving said reflecting means to said position in response to receipt of a slide transparency in said receiving means.